July 4, 1933.  T. EARLE  1,916,858
MILLING MACHINE
Filed Oct. 19, 1929   2 Sheets-Sheet 1

INVENTOR.
Theodore Earle
BY
Rolland S. Trott
ATTORNEY.

July 4, 1933. T. EARLE 1,916,858
MILLING MACHINE
Filed Oct. 19, 1929 2 Sheets-Sheet 2

INVENTOR.
Theodore Earle
BY
Roland S. Trott
ATTORNEY.

Patented July 4, 1933

1,916,858

UNITED STATES PATENT OFFICE

THEODORE EARLE, OF DENVER, COLORADO

MILLING MACHINE

Application filed October 19, 1929. Serial No. 400,925.

My invention relates to milling machines, and more especially to a machine wherein material having separable constituents is subjected to a rubbing action of constant velocity, such rubbing action being intermittent.

In some ores, such as vanadium ores, the valuable and softer constituents are mechanically mixed with harder constituents of little or no value and it is necessary to break the mechanical adherence of these constituents before they can be separated; that is, the softer constituents must be rubbed free of the harder constituents.

Also, in the making of some kinds of glass or ceramics, much of the sand or other material that might be used, has a small quantity of iron or other harmful impurity in mechanical combination therewith, which renders it worthless.

The impurities must be rubbed free and separated from the harder and useful material, before it can be used, and the difficulty this presents at present precludes the proper establishment of certain industries near certain natural deposits.

In any such industry where the margin of profit is small, the cost of operation of any separation process must be kept to the lowest possible figure; and a process in which the maximum rubbing action and capacity may be obtained and in which the first cost and the maintenance of the machines are low, will operate toward this end.

The object of this invention, therefore, is to provide a machine in which the constituents of the material are, in a continuous stream, rubbed free from each other by an intermittent rubbing action which is of high and constant velocity, and are subsequently separated.

A further object of this invention is to provide a mechanical rubbing device in which the process may be carried out, so far as the rubbing part thereof is concerned.

A further object is to provide a mechanical, intermittent rubbing device whose rubbing action is at constant velocity and through which material may be passed in a continuous stream, so that large capacity may be obtained, and which device will act to rub the softer constituents from the harder constituents.

A further object is to provide such a machine, which, because of its large capacity, cheap and simple construction and excellent results may be used profitably even on material on which the margin of profit is small.

I attain the above objects by providing a machine in which the material is continuously treated by a constant velocity rubbing action that is intermittent in its operation upon the material, and the subsequent separation of the disassociated constituents; and by providing a machine having a longitudinally extending shell, a revolvable shaft parallel with the axis of the shell, and spring impelled mullers mounted on the shaft, whereby the revolution of the shaft moves the mullers at constant velocity to contact with the material in the shell, the material being also moved from the feed end to the discharge end of the shell and the constituents being separated in any case subsequent to their disassociation.

All of this is described more in detail below, and is illustrated in the drawings, in which:—

Figure 1:
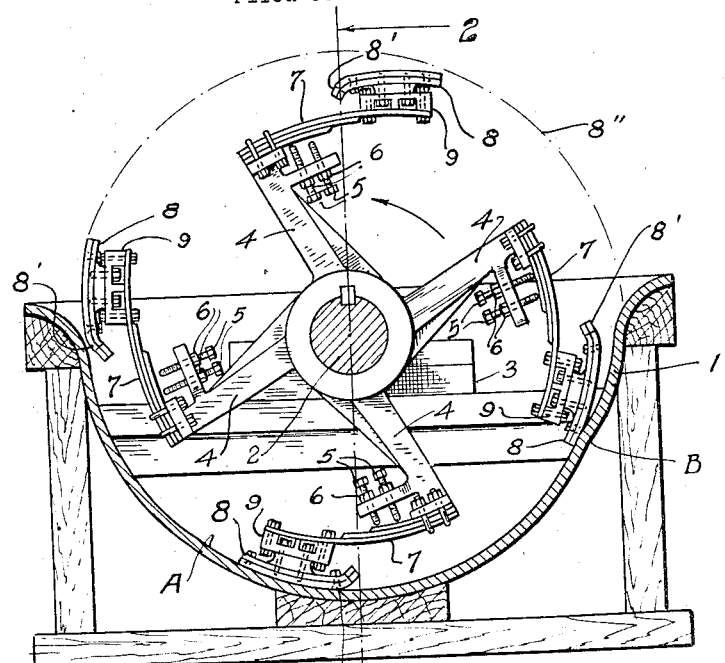
Figure 1 is a diagrammatic sectional view of my machine.
Figure 2:
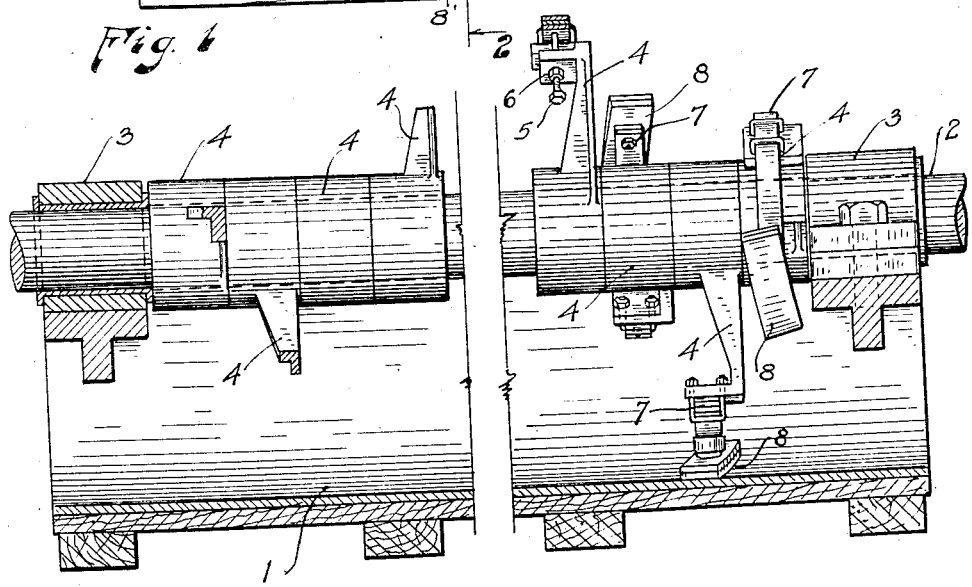
Figure 2 is a fragmentary longitudinal section on the line 2—2 of Figure 1.

The shell 1, is preferably cylindrical for the portion of its periphery between the points A and B, and the material to be treated is to be fed in at one end and discharged from the other end, as will appear below.

The shaft 2 is to be properly journaled at the ends of the shell upon the framework 3, which may be either integral with or separate from the shell 1.

The shaft 2 is to be properly revolved at the desired slow speed by any proper power means.

The arms 4 are securely attached to the shaft 2 and are provided with the set screws 5 and the lock nuts 6.

To the arms 4 are properly attached the springs 7.

The mullers 8, which may be faced with rubber as shown or with any other proper material, are attached to the blocks 9, which blocks 9 are attached to the ends of the springs 7. The blocks 9 are to be made of rubber or any other proper material which will permit a slight aligning movement of the mullers with respect to the spring 7.

Any other proper construction or method of mounting the mullers may be used, however, if desired, so long as it is reliable and satisfactory.

The mullers 8 are mounted at an angle to their plane of rotation so that their leading side faces will act as rakes to move the material axially as the mullers are revolved with the shaft 2.

The leading end of the mullers 8 is turned upward as at 8' so that it will ride up upon the material in the shell 1, or up upon the shell 1 at the point A and thus put pressure upon the springs 7 as the rubbing action begins during each revolution of the mullers.

As the mullers move from the point A to the point B they rub the material contained in the shell 1, at constant velocity, while the leading faces of the mullers move the material axially along the shell 1, and the combined action of the rubbing faces of the mullers and their leading angular faces acts to move the material along the periphery of the shell toward or past the point B.

As each muller passes the point B its spring 7 acts to force the muller outward so that it describes a circle having a larger radius than that of the shell between the points A and B, such as indicated at 8''.

Under some conditions however, where it is desired to rub a thick layer of material gently, it might be that the springs 7 would be so constructed and adjusted that the mullers would not quite touch the shell 1 when no material is upon it.

Material that has been moved toward or past the point B by each muller and to a position steeper than the angle of repose, will roll or fall back or be washed toward the point A after the muller has passed on.

Thus, the material is rubbed at constant velocity intermittently; the constant velocity being set by the speed of the shaft, at the highest figure that is found to give efficient results so that the maximum amount of rubbing may be done, and the intermittent action permits a falling apart and separation of the constituents and a new arrangement of particles prior to the next constant high velocity rubbing action due to the radius of the mullers from the shaft to the slow rotation of the shaft results in comparatively high velocity rubbing action at the mullers.

That is, as each muller 8 approaches the cylindrical portion of the shell, as at A, it contacts with the shell or the material on the shell and due to the turned up end 8' rides up upon the shell and upon the material on the shell, and by this contact is moved inward against the pressure of the spring 7.

The amount of pressure on each muller 8 may be regulated to suit conditions and materials by adjustment of one or more of the set screws 5, the adjustments being locked in place by the lock nuts 6.

Additional adjustments of this pressure are possible by variation in the thickness of the blocks 9 and in the construction of the springs 7.

As the mullers revolve they rub the material in the shell 1 with a resilient rubbing pressure, which acts to thoroughly clean the attached softer constituents from the harder constituents.

The arms 4 are so constructed and positioned upon the shaft 2 as to give the mullers regular angular spacing as shown in Figure 1, with the path swept over by each muller overlapping or adjacent that swept over by axially adjacent mullers. Thus, each muller provides not only a rubbing action against the shell 1, but also a raking action tending to move the material progressively to the next adjacent muller path.

Material that is moved too far up the side of the shell 1 as at B falls back as each muller passes, and is acted upon again.

Figure 6:
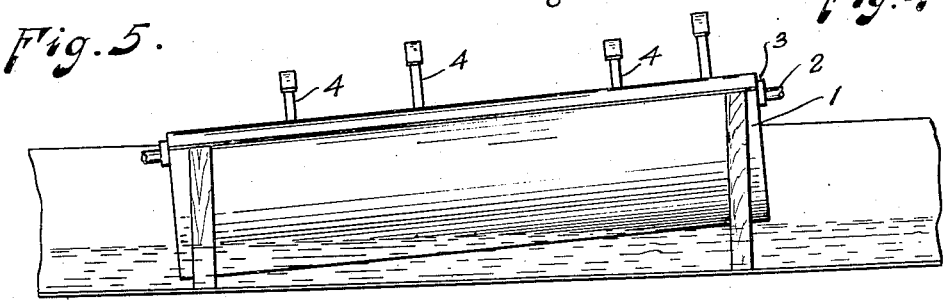
Figure 6 is a diagrammatic side view of my machine with a liquid bath in which the separation of the constituents takes place subsequent to their disassociation.

The shell 1 may be used with a liquid bath, and inclined, as shown in Figure 6, the amount of inclination and of immersion in the bath furnishing two more variables to be used, if required, in obtaining just the results required in any case.

By change of the angle of the mullers on the arms 4, the material may be fed in at either end of the shell and discharged at the other end of the shell, whether the shell is horizontal, inclined upward, or inclined downward from the feed end, either dry or in a liquid bath, all depending upon conditions, material, the results required and the other operations to which the material may be subjected in any particular case.

Figure 7:
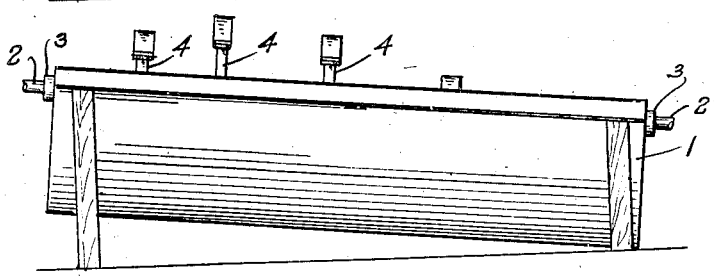
Figure 7 is a diagrammatic side view of a dry installation of my machine.

The shell 1 may be inclined and operated dry as shown in Figure 7 with the mullers inclined to act as rakes to move the material in either direction, so long as the result is that the material is moved by the mullers from the feed end to the discharge end of the shell 1.

The incline of the shell 1, the direction and amount of angle of the mullers, the use of wet or dry operation, the pressure on the mullers and the speed of revolution of the shaft 2 are all factors which must be considered and proportioned for each material and set of conditions to give in the end the rubbing action required and the effect upon the material that is sought, and as competent mill men will perceive.

Figure 3:
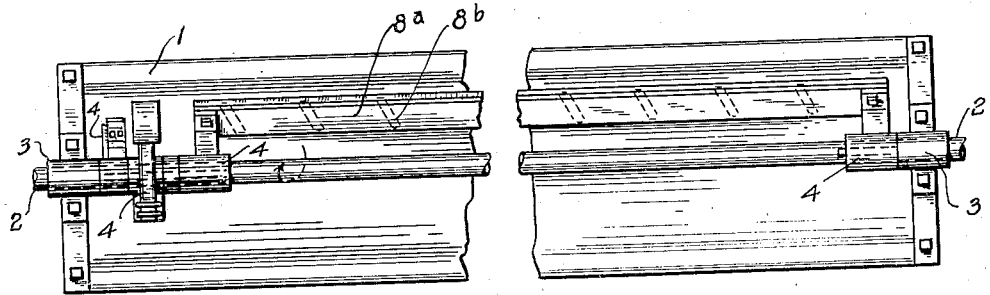
Figure 3 is a fragmentary diagrammatic plan view, showing two forms of muller construction.

When a long muller, such as shown at 8a in Figure 3 is used, inclined grooves in its outer face such as indicated at 8b may be provided in the muller face to act to move the material axially.

Figure 5:
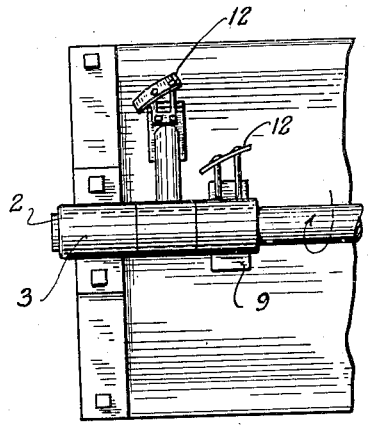
Figure 5 is a fragmentary plan view of the construction shown in Figure 4.
Figure 4:
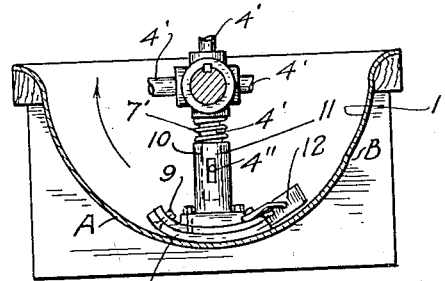
Figure 4 is a fragmentary diagrammatic section of a modified form of muller and separate rake construction.

In the modified form shown in Figures 4 and 5, the arms 4' are cylindrical, and the mullers 9 are provided with sleeves 10 having longitudinal slots 11 through which the pins 4'' extend.

The pins 4'' are mounted in the arms 4' and act to prevent the turning of the mullers 9 on the arms 4' and to limit the outward movement of the mullers 9 on the arms 4'.

The springs 7' upon the arms 4' act to put outward resilient pressure on the mullers 9.

The mullers 9 are set parallel with their plane of rotation and carry the rakes 12 which act to move the material axially in the shell 1.

Any other proper rake construction and mounting desired may be used so long as the rakes revolve with the shaft and act to move the material axially.

Though as shown, the muller faces are of rubber and the shell 1 is of metal, any other proper material may be used for either or both to properly fit the machine and the results it produces to any material or requirement.

Having now described my machine for carrying out the operation described, what I claim as new and desire to protect by Letters Patent, is as follows:—

1. In a rubbing device for rubbing the adhered softer constituents of a material from its harder constituents, a stationary member having a longitudinally extending smooth substantially semi-cylindrical surface, a rotatable shaft mounted substantially centrally to said semi-cylindrical surface of the stationary member and provided with arms securely mounted thereon, rubber faced mullers adapted to contact with said semi-cylindrical surface as the shaft revolves and means carried by said arms to mount the mullers and to hold each of them in resilient contact with the semi-cylindrical surface of said stationary member, during substantially half of each revolution of said shaft.

2. In a device for scrubbing the surfaces of a granular material, a stationary member having a longitudinally extending smooth substantially semi-cylindrical surface, a rotatable shaft mounted substantially centrally to said surface and provided with arms securely mounted thereon, rubber faced mullers adapted to contact with the said semi-cylindrical surface as the shaft revolves and positioned at an angle to their plane of revolution to act as rakes to move material resting upon the stationary member axially, and means carried by said arms to mount the mullers and to hold them in resilient contact with the semi-cylindrical surface of the stationary member on each revolution of the shaft.

3. A device for scrubbing the surfaces of a granular material composed of a stationary member having a longitudinally extending smooth concave substantially semi-cylindrical surface, a rotatable longitudinally extending shaft mounted substantially centrally to said semi-cylindrical surface and provided with arms axially and angularly spaced from each other securely mounted thereon, rubber faced mullers adapted to contact with the stationary member on each revolution, and means carried by said arms to normally mount the mullers resiliently at a greater radius than that of said stationary member's semi-cylindrical surface, whereby rotation of the shaft will cause the mullers to rub material held by said stationary member and move it axially thereon.

4. A device for scrubbing the surfaces of a granular material composed of a stationary member having a longitudinally extending smooth concave substantially semi-cylindrical surface, a rotatable longitudinally extending shaft mounted substantially centrally to said semi-cylindrical surface and provided with arms axially and angularly spaced from each other securely mounted thereon, rubber faced mullers adapted to contact with the stationary member on each revolution, and means forming a radially resilient mounting of the mullers on the arms.

5. A device for scrubbing the surfaces of a granular material composed of a stationary member having a longitudinally extending smooth concave substantially semi-cylindrical surface, a rotatable longitudinally extending shaft mounted substantially centrally to said semi-cylindrical surface and provided with arms axially and angularly spaced from each other securely mounted thereon, and rubber faced means carried by the arms and adapted to have resilient contact with said stationary member whereby a rubbing action and axial movement for the material carried by the stationary member is provided.

6. A device for scrubbing the surfaces of a granular material composed of a stationary member having a longitudinally extending smooth concave substantially semi-cylindrical surface, a rotatable longitudinally extending shaft mounted substantially centrally to said semi-cylindrical surface, and rubber faced means carried by the shaft adapted to resiliently rub material carried by said stationary member transversely to said shaft and to move said material axially upon said stationary member.

7. A device for scrubbing the surfaces of a granular material composed of a stationary member having a longitudinally extending smooth concave substantially semi-cylindrical surface, a rotatable longitudinally extending shaft mounted substantially centrally to said semi-cylindrical surface, and rubber faced means carried by and moving with said shaft and adapted to resiliently rub material carried by the stationary member transversely thereof and to move it axially thereon.

8. A device for scrubbing the surfaces of a granular material composed of a stationary member having a longitudinally extending smooth concave substantially semi-cylindrical surface, a rotatable longitudinally extending shaft mounted substantially central of said semi-cylindrical surface, and rubber faced means carried by the shaft to transversely rub and axially move material upon the said stationary member.

In testimony whereof I affix my signature.

THEODORE EARLE.